United States Patent [19]

Kim

[11] Patent Number: 4,987,628
[45] Date of Patent: Jan. 29, 1991

[54] SHOE SOLE MOLDING SYSTEM

[75] Inventor: Hae Y. Kim, Busan, Rep. of Korea

[73] Assignee: Sung Bo Ind. Co., Ltd., Busan, Rep. of Korea

[21] Appl. No.: 424,122

[22] Filed: Oct. 19, 1989

[30] Foreign Application Priority Data

Jun. 30, 1989 [KR] Rep. of Korea .................... 9348/89

[51] Int. Cl.⁵ .......................... A43D 25/20; B29F 1/10
[52] U.S. Cl. .................................... 12/17 R; 12/1 R; 425/119
[58] Field of Search ............ 12/17 R, 146 B, 146 BR; 425/129.2, 119

[56] References Cited

U.S. PATENT DOCUMENTS

| | | | |
|---|---|---|---|
| 4,608,724 | 9/1986 | Stengelin | 12/17 R |
| 4,722,677 | 2/1988 | Rebers | 425/119 |
| 4,801,256 | 1/1989 | Landwehr et al. | 425/119 |
| 4,810,178 | 3/1989 | Proll et al. | 425/119 |
| 4,854,841 | 8/1989 | Graf et al. | 425/119 |

Primary Examiner—Steven N. Meyers
Attorney, Agent, or Firm—Fleit, Jacobson, Cohn, Price, Holman & Stern

[57] ABSTRACT

This invention relates to a shoe sole molding system comprising a press for molding a shoe sole and a mold control assembly for controlling mold members from the press. The mold control assembly comprises a body assembly movable up-and-down by means of hydraulic cylinder and piston. A carriage of box-shape in general is provided for carrying the body member and a rail member is provided for rollably engaging with the carriage member. Within the body member are nested two frame members in turn each carrying channel member for slidably engaging with the mold members in the press, thereby pulling out the mold members of the press, inserting the mold members into the press after the molding product is removed from the mold members.

2 Claims, 20 Drawing Sheets

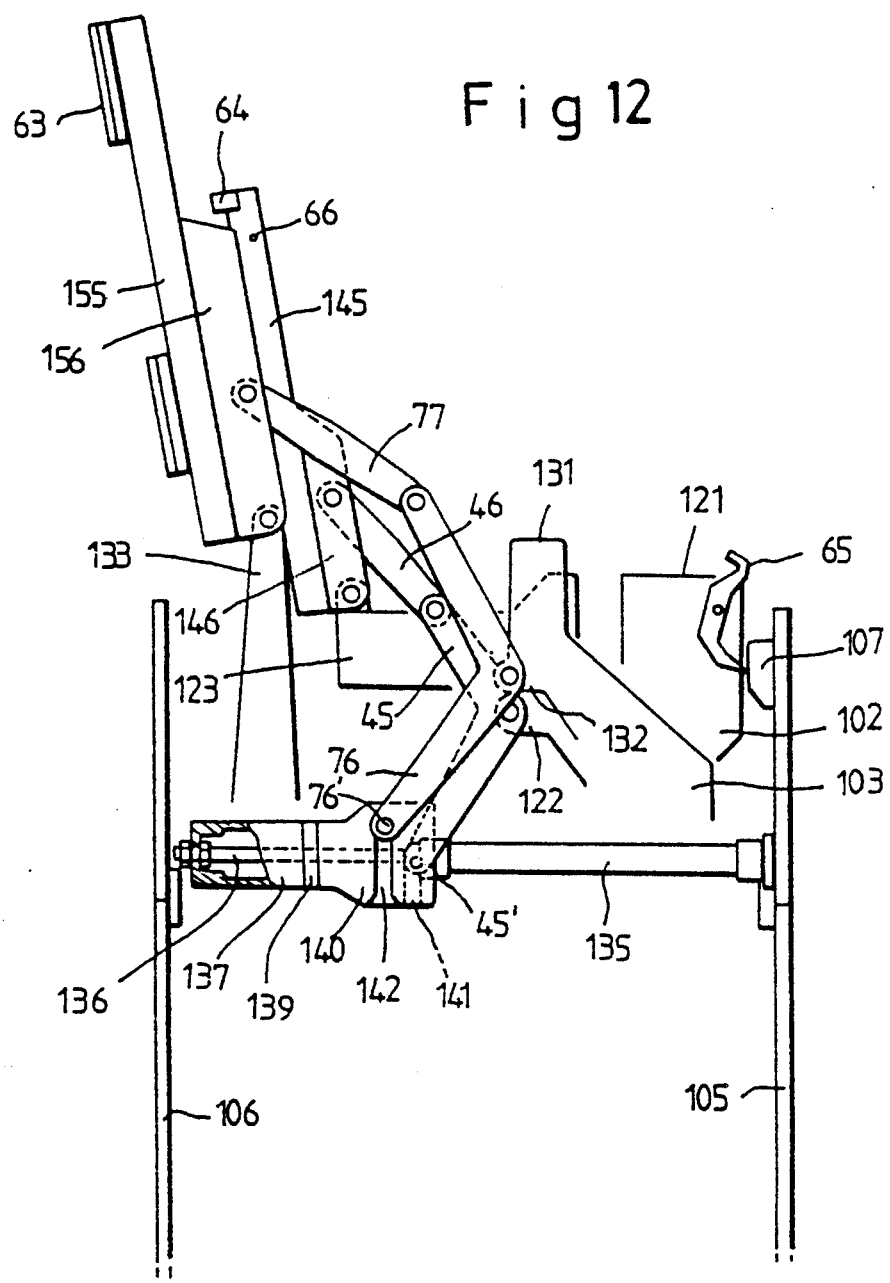

SHOE SOLE MOLDING SYSTEM

BACKGROUND OF THE INVENTION

This invention relates to a shoe sole molding system, wherein in-and-out or separation of the mold members is achieved automatically.

In general, a shoe sole molding system requires mold members, heat applying means to the mold members, and raising-lowering means of the mold members. The mold normally comprises an upper mold member for molding of the contour, a middle mold member for molding of the inner shape and a lower mold member for molding of the bottom face of a shoe sole.

With the typical molding system, the raising and lowering of the mold members, inserting of rubber material into the mold members and location of the members in registration have been achieved manually. Such manual operation has a number of definite disadvantages.

A considerable amount of labor force is required because raising and lowering of the heavy mold members has to be repeated manually causing a worker to feel tired very easily. As a consequence, work efficiency is very low thus producing bad quality of goods. In addition, the molding requires very experienced worker, because molding time depends upon only his experience.

SUMMARY OF THE INVENTION

The present invention is directed towards overcoming the above disadvantages.

The shoe sole molding system of the present invention comprises a press having three mold members therewithin and a mold control assembly. The mold control assembly comprises a carriage member and a body on the carriage member. The assembly body comprises spaced front and rear wall members extending upwardly. Mounted within the wall members are nested a bigger channel frame and a smaller channel frame. Each frame has a link for separating the mold members. A plurality of cylinders are provided for pulling out, pushing back, and separating the mold members.

BRIEF DESCRIPTION OF THE DRAWINGS

The invention will now be described in detail with reference to the accompanying drawings wherein:

FIG. 12 is similar to FIG. 11, but showing the link in raised position;

DETAILED DESCRIPTION OF THE INVENTION

Figure 1:
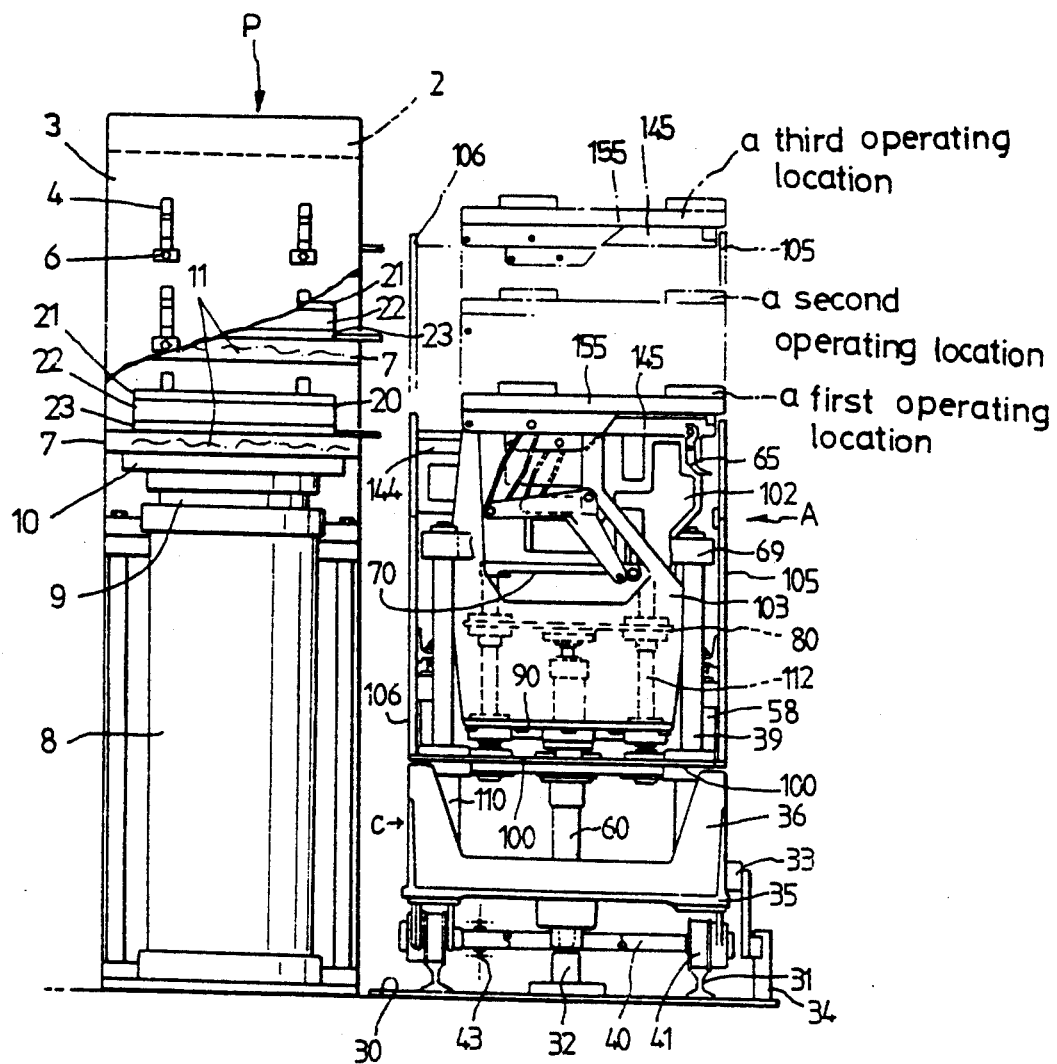
FIG. 1 is a side elevational of a shoe sole molding system of the present invention, showing the mold control assembly in registration with the press.
Figure 2:
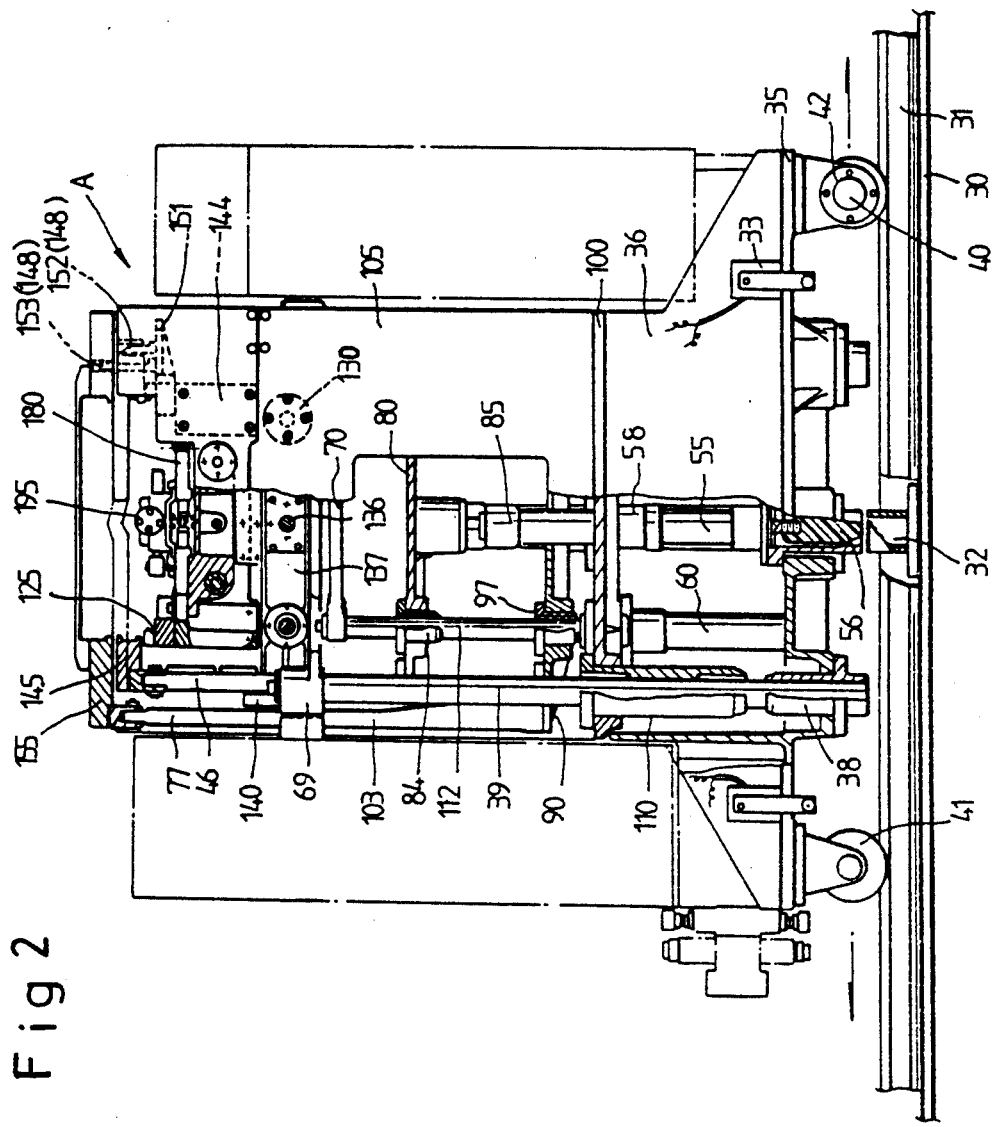
FIG. 2 is a front elevational view of the mold control assembly of the present invention, partially broken away and in cross-section.

Referring to the drawings, a shoe sole molding system of the present invention comprises a press P and a mold control assembly A.

The press P comprises a housing 3, a hydraulic cylinder 8 and a piston 9 provided within the housing 3. A pressure board 10 is fixed to the upper end of the piston 9.

Molds 20 having an upper mold member 21 a middle mold member 22 and a lower mold member 23 and mold support plates 7 are provided above the piston 9.

One of the molds 20 and the corresponding support plate 7 are detachable mounted on the pressure board 10. The other molds and support plates are displaced one above the other as shown FIG. 1.

The press housing 10 has a plurality of slits 4 through which bolts 6 are received for connecting with the corresponding mold support plates 7. The mold support plates 7 each has a heating element therein.

Figure 3:
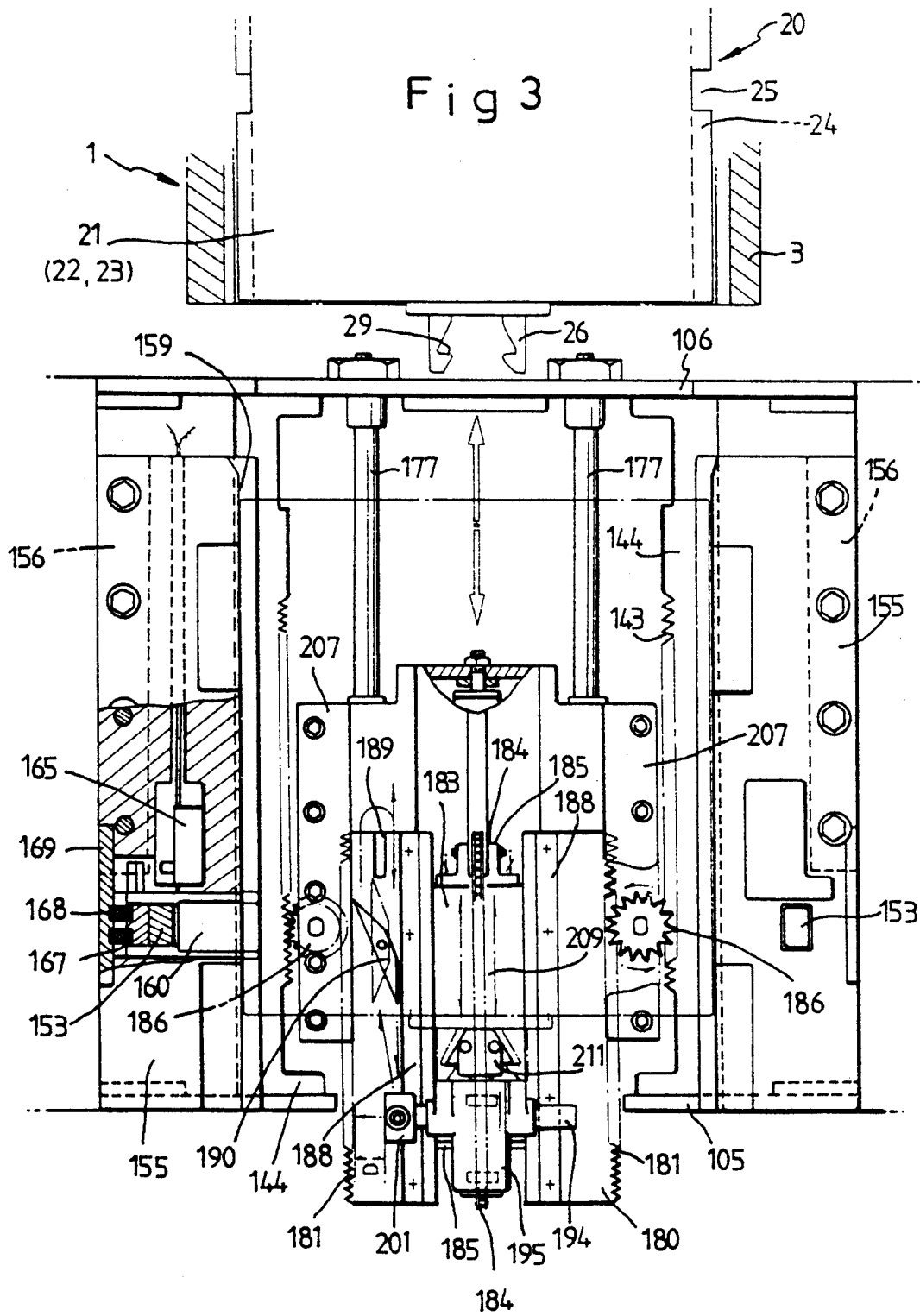
FIG. 3 is a plan view showing details of the slider member and mold members.

Referring particularly to FIG. 3, each mold member has a pair of channeled portions 24 facing in an outward direction along the lower length thereof and a pair of notches 25. The lower mold member 23 has a latch member 26 fixed to the front end thereof, which latch member 26 has a pair of integral hook-shaped members 29.

With the before described press P, upon applying hydraulic fluid to the cylinder 8, the piston 9 together with the pressure board 10 will be forced upwardly so as to raise the mold carriage member 7 together with the mold 20 therewith. Each mold support plate 7 is raised up to the uppermost end of the corresponding slits 4 so that the mold 20 will join along the adjacent mold 20.

Upon permitting the hydraulic fluid to drain from the cylinder 8 the molds 20 are lowered and separated from the adjacent mold 20. The pulling out of the mold members through a mold control assembly is to be now described.

The mold control assembly comprises a box-shaped carriage member C and a main body. A rail assembly is provided for carrying the box-shaped carriage member C. The rail assembly comprises a fixed base 30 and a pair of rails 31 provided thereon. A hollow boss 32 is upwardly extending from the base 30.

Figure 10:
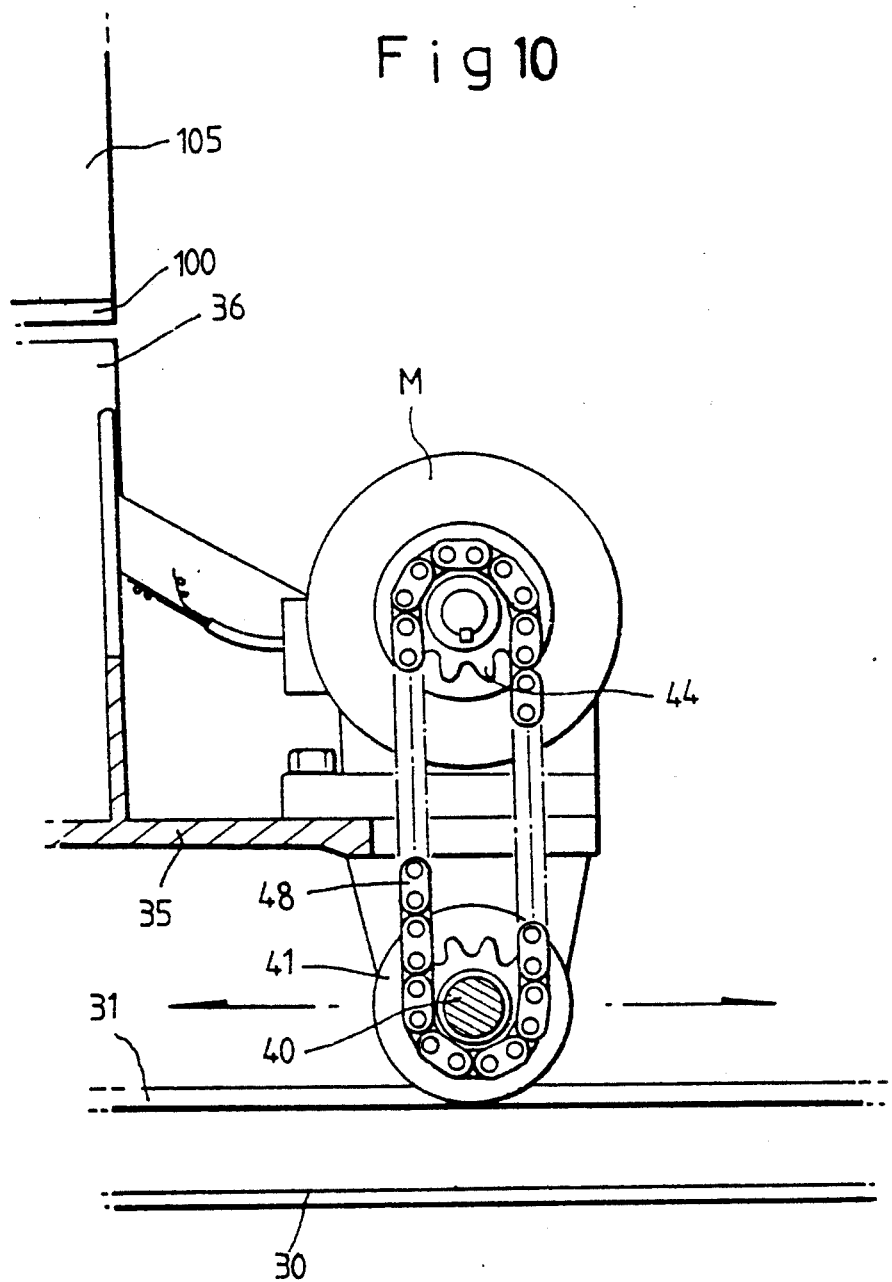
FIG. 10 is a view showing the roller and motor in connected position.
Figure 11:
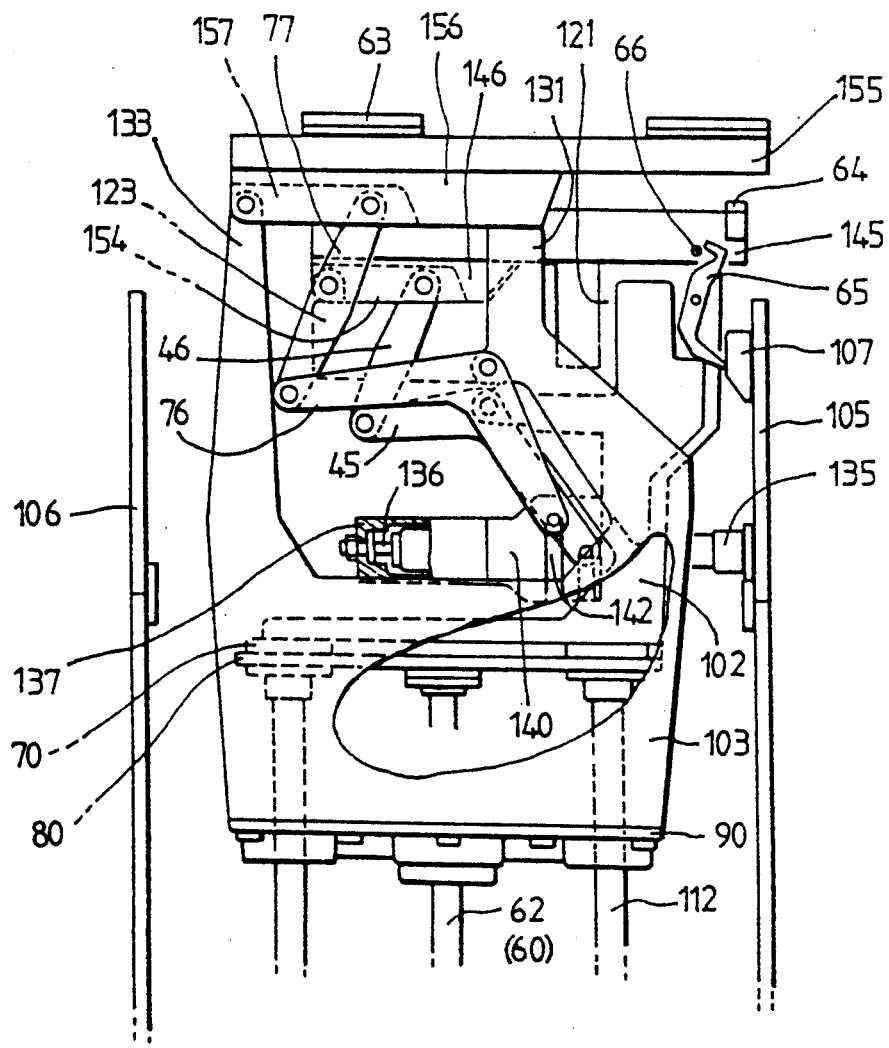
FIG. 11 is a view showing a link engaging with the inner wall member of the inner frame.

The carriage member C has spaced pairs of rollers 41 which are disposed so as to be rollable engageable with the rails 31 to advance the carriage member C therealong. Cross shafts 40 are provided for mounting the rollers 41 thereon. Sprockets 43 around which a chain 48 is wound are mounted on the shafts 40 for connecting with the main body. The box-shaped carriage member C comprises a base 34 and four wall members of U-shape fixed to the base 34. The front and rear wall members each has widened bottom ends on both sides thereof. To the widened bottom ends are ounted motors M having sprockets 44 over which the chains 48 pass. The chains 48 then pass over the roller sprockets 43. Switches 33 are mounted fixedly on the front and rear wall members (see FIG. 10).

The carriage base 35 has a center hole through which a carriage anchor cylinder 55 is fixedly received, and four corner recesses for receiving fixedly hollow shorter columns 38. The anchor piston has a pin 56 on the bottom end thereof for being detachably received in the boss 32 on the rail base 30, whereby the mold control assembly will hold in place so as to cooperate with the press P. In the four hollow shorter columns are slidably received four columns 39.

Figure 23:
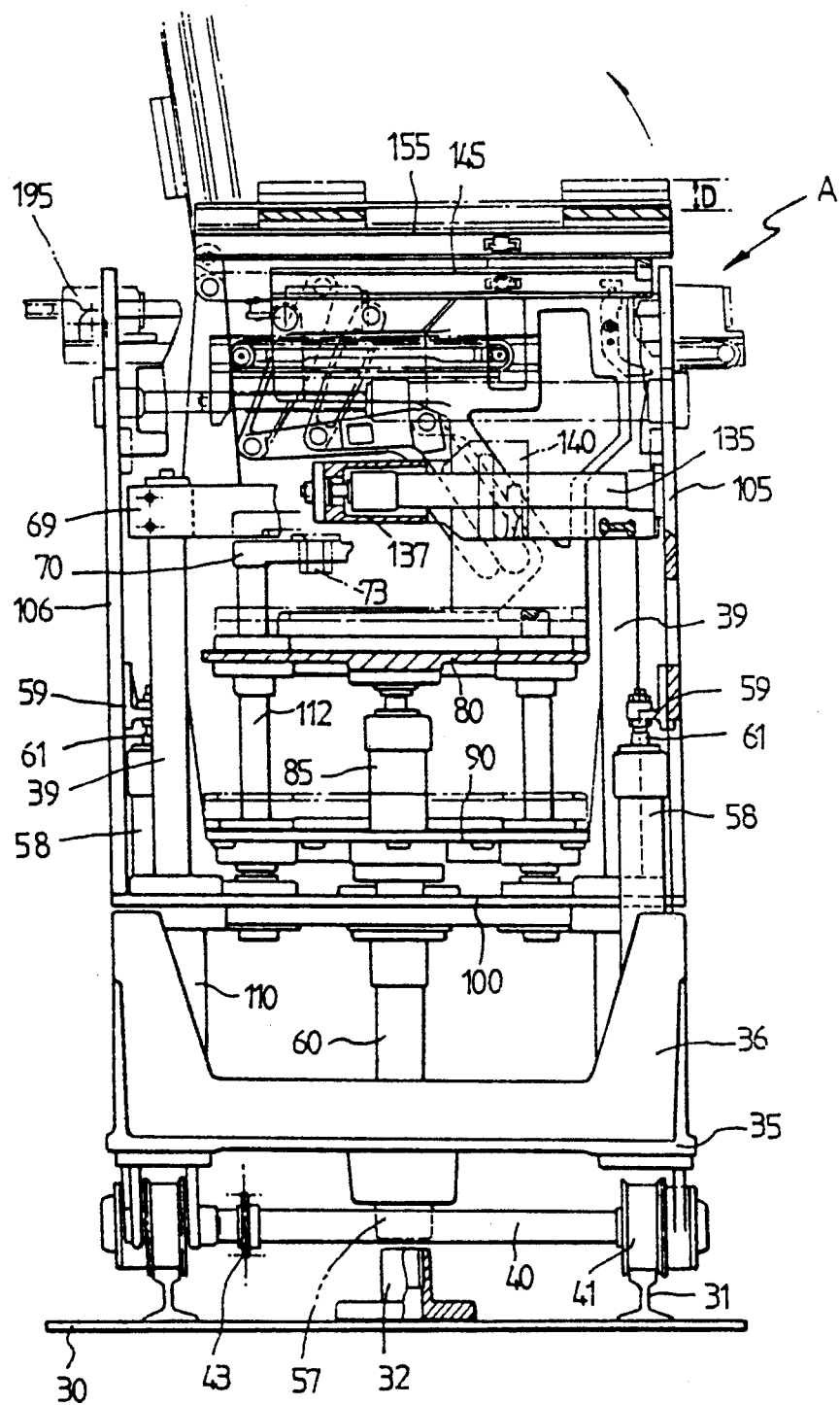
FIG. 23 is a side elevational view of the mold control assembly showing details of the links and the channel bars.

To the base 34 adjacent the front and rear carriage wall members are a pair of height control cylinders 58. The height control cylinders 58 are anchored at 59 respectively to front and real body side support members 105 and 106 (see FIG. 23). With the assembly, the mold control assembly body can be raised or lowered so as to be in position in registration with the mold 20 which will be pulled out by the mold control assembly.

The carriage base 34 also has an outer or bigger frame control cylinder 60 fixed thereto. On the box-shaped carriage member C is mounted a rectangular cover plate 100 to both sides of which are fixed the front and rear body wall members 105 and 106.

The carriage cover plate 100 has four corner holes 101 in registration with four corner holes in the carriage base 34 through which hollow shorter columns 110 are fixedly received. Through the four corner holes 101 extend the columns 39 consecutively from the hollow columns 38 on the carriage base 34. The rectangular cover plate 100 has a plurality of recesses 111 inwardly of the corner holes 101 in which shafts 112 are fixedly received at their bottom ends. To the center of the cover plate 100 is fixed a smaller frame control cylinder 86 at its bottom end.

Over the cover plate 100 and the shafts 112 the bigger frame and the small frame are provided one within the other.

The bigger or outer frame member comprises a base plate 90, side wall members 103 upwardly extending from the both sides 91 of the base plate 90, and channel bars 155 pivoted to the side wall members 103. The channel bars 155 are joined by a means 63 at the upper faces thereof.

The bigger base 90 has a plurality of holes 92 in registration with the recesses 111 in the cover plate 100 through which the shafts pass. Some of the holes 92 have fixing means 97 for closely passing the shafts around thereof. A bigger center hole 93 is provided in the bigger base 90 for passing the small frame control cylinder 86 therethrough. For controlling the bigger frame, the cylinders 60 are fixed to the underside of the bigger base 90.

Figure 14:
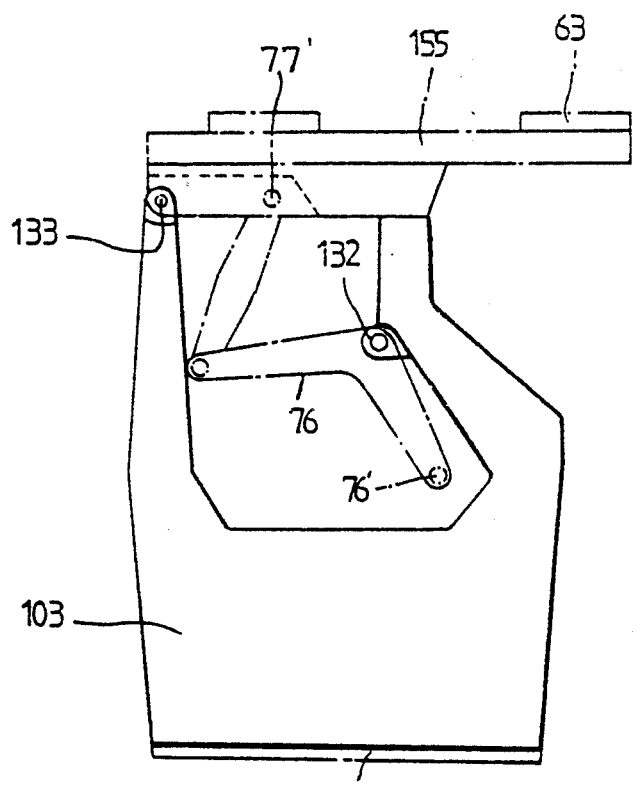
FIG. 14 shows a bigger or outer side wall member having mounted thereon a link and channel bar pivoted to one another.
Figure 13:
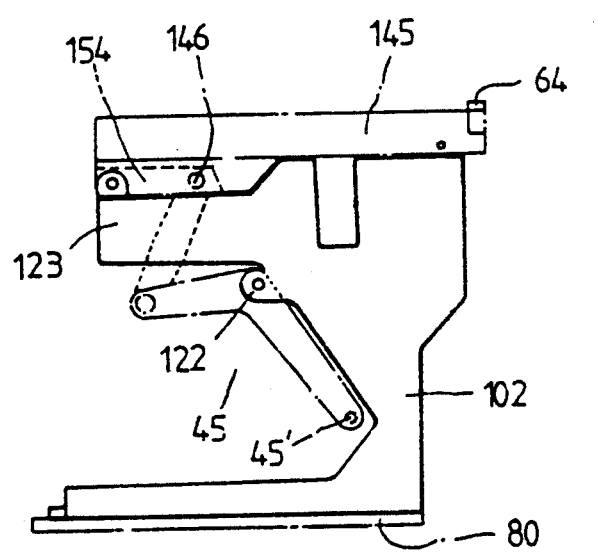
FIG. 13 shows the smaller or inner side wall member having mounted thereon a link and channel bar pivoted to one another.
Figure 15:
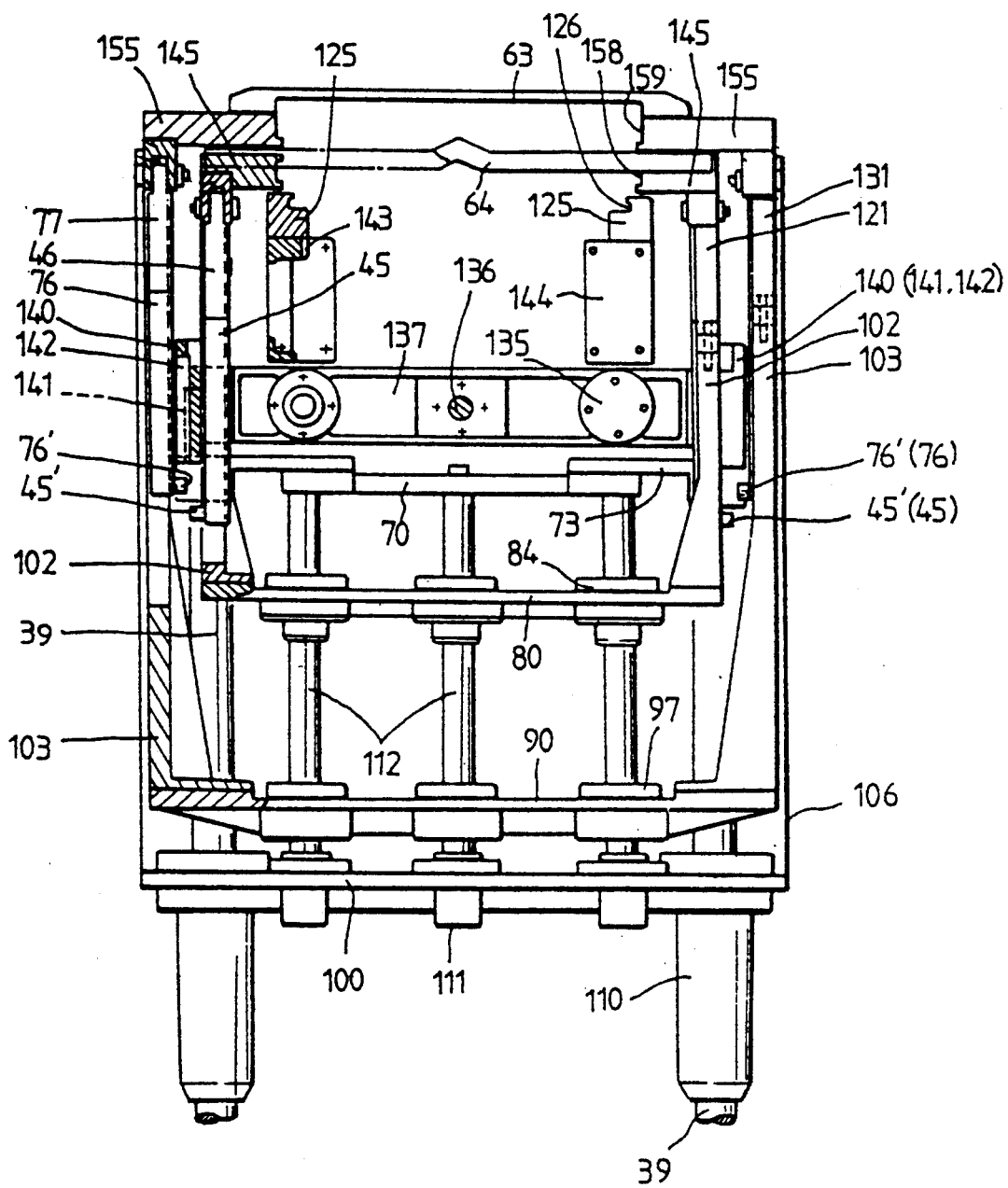
FIG. 15 is similar to FIG. 2, but showing the carriage member removed.

Referring particularly to FIG. 14, a pair of side walls 103 fixed to both side ends of the bigger base 90 each has a link 76 pivoted at 132 thereto and an inwardly extending protrusion 76'. The link 76 is pivoted at 77 to the channel bar 155 and the side wall member 103 is pivoted at 133 to the channel bar 155.

A pair of spaced channel bars 155 each has a channel portion facing in an inward direction within which the middle mold member is telescopic. A longitudinal through hole 148B is provided in the channel 155. Mounted within the bigger frame is nested the smaller frame. The smaller frame comprises a base plate 80 above the bigger base plate 90, a pair of side wall uprights 102 inwardly of the bigger uprights 103. The chanel bars 145 are joined by a means 64 at the upper faces thereof. The smaller base has a plurality of holes 82. The holes 82 are in registration with the holes 92 and the recesses 111 in the bigger base 90 and the cover plate 100 respectively. Through which the shafts 112 extends. Some of the holes 82 have fixing means 84 for closely passing the shafts 112 around thereof.

Referring particularly to FIG. 14, a pair of the side uprights 102 each has a link 45 pivoted at 122 thereto with an outwardly extending protrusion 45' fixed to the lower end thereof. The link 45 is pivoted at 146 to the channel bar 145 and the side upright 102 is pivoted at 123 to the channel bar 155. A locking element 65 is provided on the top portion of the side uprights 102 for engaging a protrusion in the channel bars 145. A pair of spaced channel bars 145 each has a channel portion facing in an inward direction within which the upper mold member is telescopic. Two holes 148A and 148 are provided in the channel bars 155, one hole 153 being in communication with the hole 148B in the upper channel member 155.

Mounted above the smaller base plate 80 is a four-cornered frame 70 to which the shafts 112 through the bigger base 90 and the smaller base 80 are bolted. To the side leg members provided inwardly of the smaller uprights 102 are bolted L-shaped members 73. Each of the L-shaped members has a longitudinal groove 74 facing in an outward direction for receiving the inwardly extending protrusion 76'. A link control cylinder 135 and a piston 136 are fixed between the body front and rear wall member 105 and 106 for slidably moving the cross plate member 137 along the shaft 130. At both ends of the cross plate member 137 are provided suspending plates 140. Each of the suspending plates 140 has a longer outer groove 142 for slidably receiving the outwardly extending link pin 76' and a shorter inner groove 141 for slidably receiving the inwardly extending link pin 45'.

Figure 16:
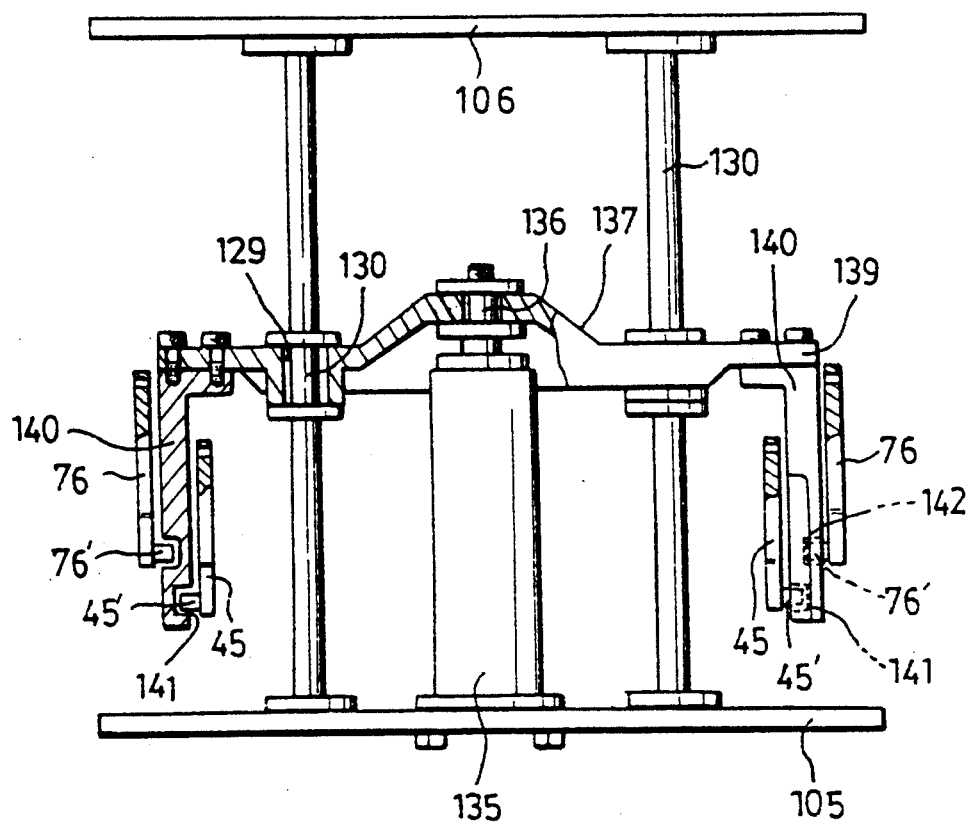
FIG. 16 is a part cross-sectional plan view of the link control slider member of the present invention.
Figure 17:
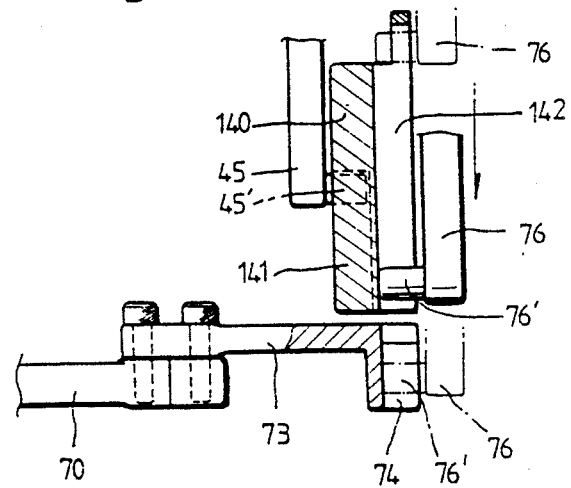
FIG. 17 is an enlarged cross-sectional view showing details of the downwardly extending member having an outer longer groove and an inner shorter groove.
Figure 18:
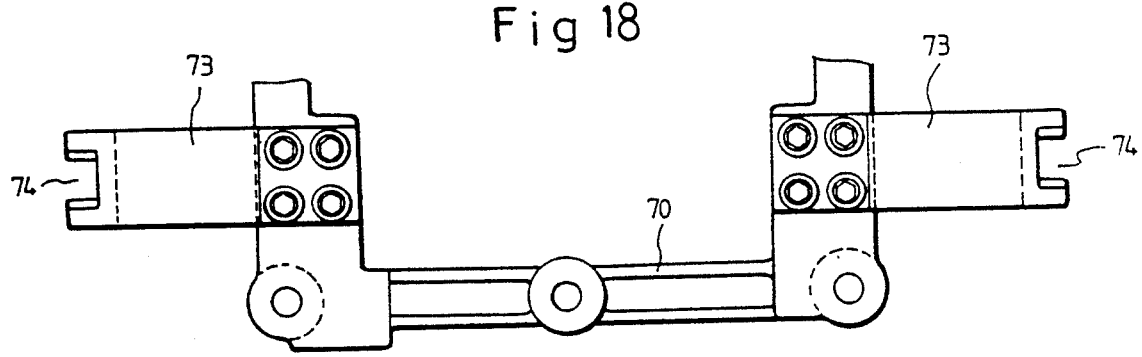
FIG. 18 shows the uppermost frame member having an opposing pair of uprights.
Figure 19:
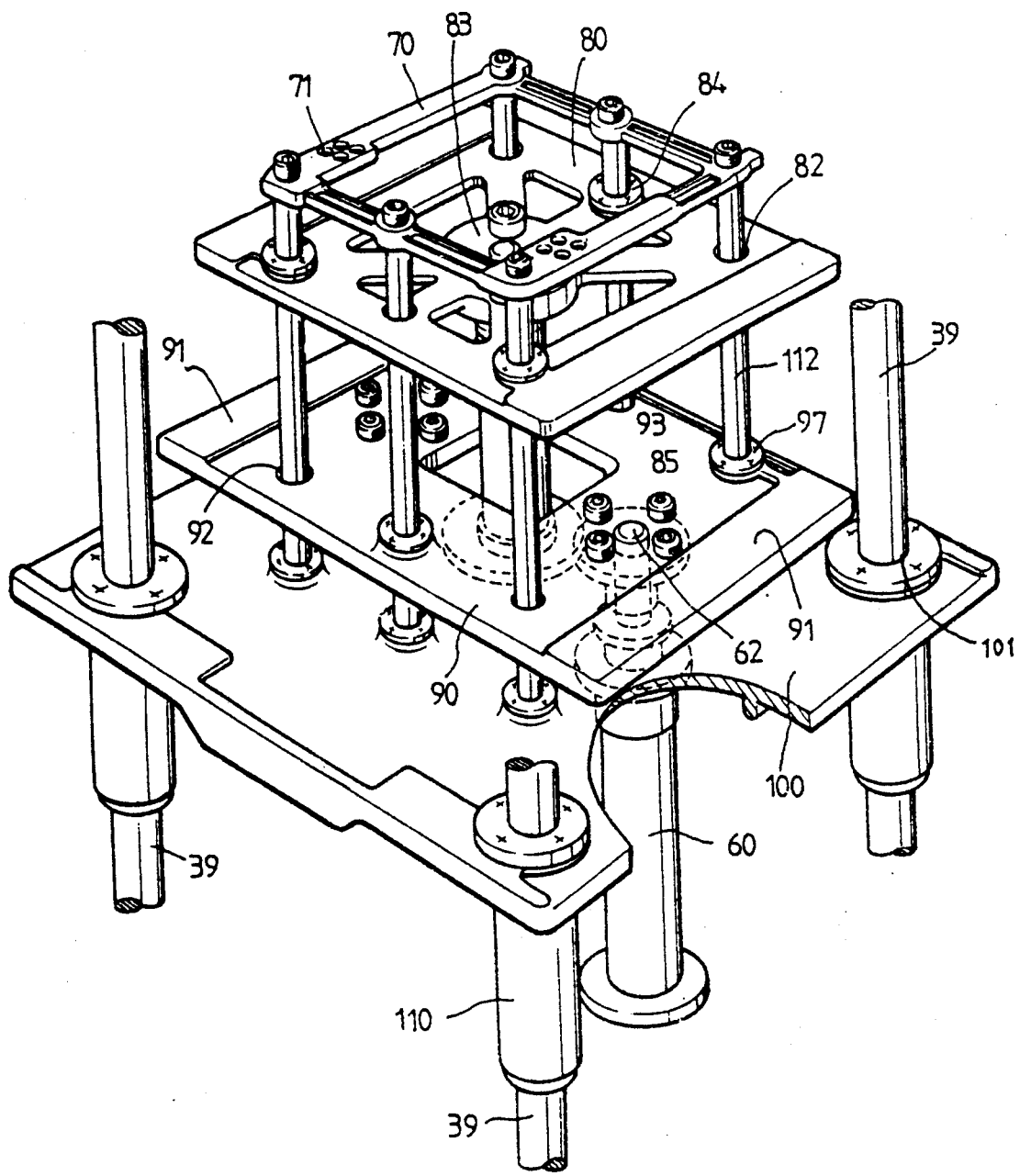
FIG. 19 is a perspective view showing carriage cover, two bases of the outer and inner frames and uppermost frame.

Above the uppermost four-cornered frame 70 is mounted a first slider member 137 and a link control cylinder 135. A link control piston 136 is fixed to the first slider member 137 on the central area thereof. On both sides of the link control cylinder 135 are horizontally provided a pair of cross shafts 130. Each of the cross shafts 130 is fixed to the front body wall and the rear body wall at both ends thereof and passes slidably through holes 129 provided in the first slider member 137. To the side ends of the first slider member 137 are fixed downwardly extending members 140. The first slider member as shown in FIG. 16 has a cross plate member 137 and a pair of shafts 130 fixed between the body front and rear wall members.

The downwardly extending members 140 each has an inner groove 141 for receiving the outer extending protrusion 45' and an outer groove for receiving the inwardly extending protrusion 76'.

Figure 4:
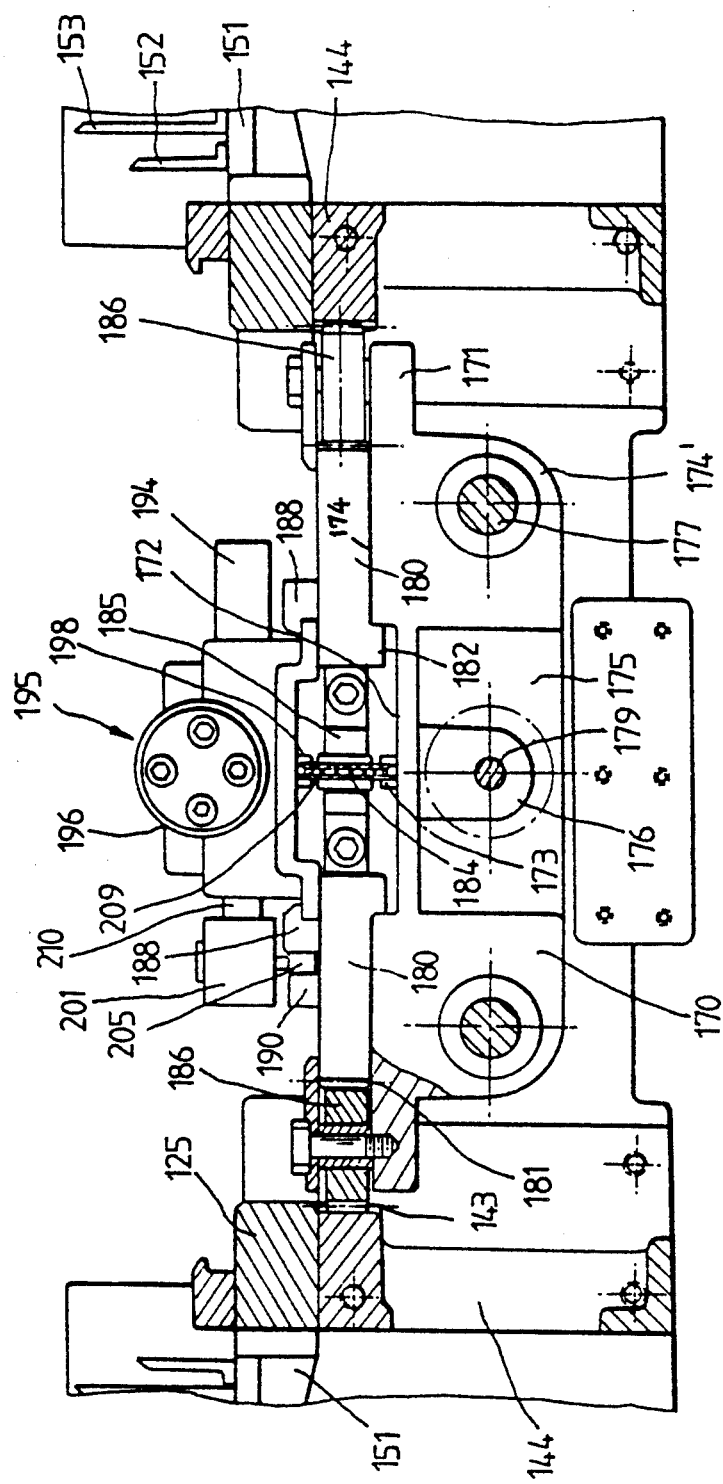
FIG. 4 is a front view, partially broken away and in cross-section showing details of engagement of a second, third and third slider member connected together and being sliddably movable with respect to one another.

Above the first slider member 137 are provided a pair of open casings 144 each of which faces in an inward direction (see FIG. 4). The casings 144 each is fixed to the front and rear body wall members 105 and 106 at both end surfaces thereof. As shown in FIG. 3, teeth 143 are formed along the lengthwise ends thereof, each of which teeth faces in an inward direction.

A pair of channel bars 125 are fixed to the corresponding open casings 144 at the bottom faces thereof for nesting the lower mold member 23.

Between the open casings 144 is provided a second stepped slider member 170. The second stepped slider member 170 comprises a pair of raised planes 174 and a channeled plate 172 joining the raised planes 174. The raised planes 174 each has downwardly extending rear and front protrusions 174' apertured therein. The channeled plate 172 has a downwardly extending rear protrusion 176 apertured therein. A chain bracket 173 is fixed to the upper face of the channeled plate 172.

As shown in FIG. 3, a pair of cross shafts 177 are fixed to the body rear and front wall members 105 and 106 at their both ends passing through the apertures in the downwardly extending protrusions 174'. A second stepped slider member cylinder 178 is fixed to the front wall 105 at the one end thereof and a second planar slider control piston 179 is fixed to the downwardly extending rear protrusion 176 at the one end thereof. A pair of pinions 186 are bolted to the end portions of the raised planes 174.

Figure 8:
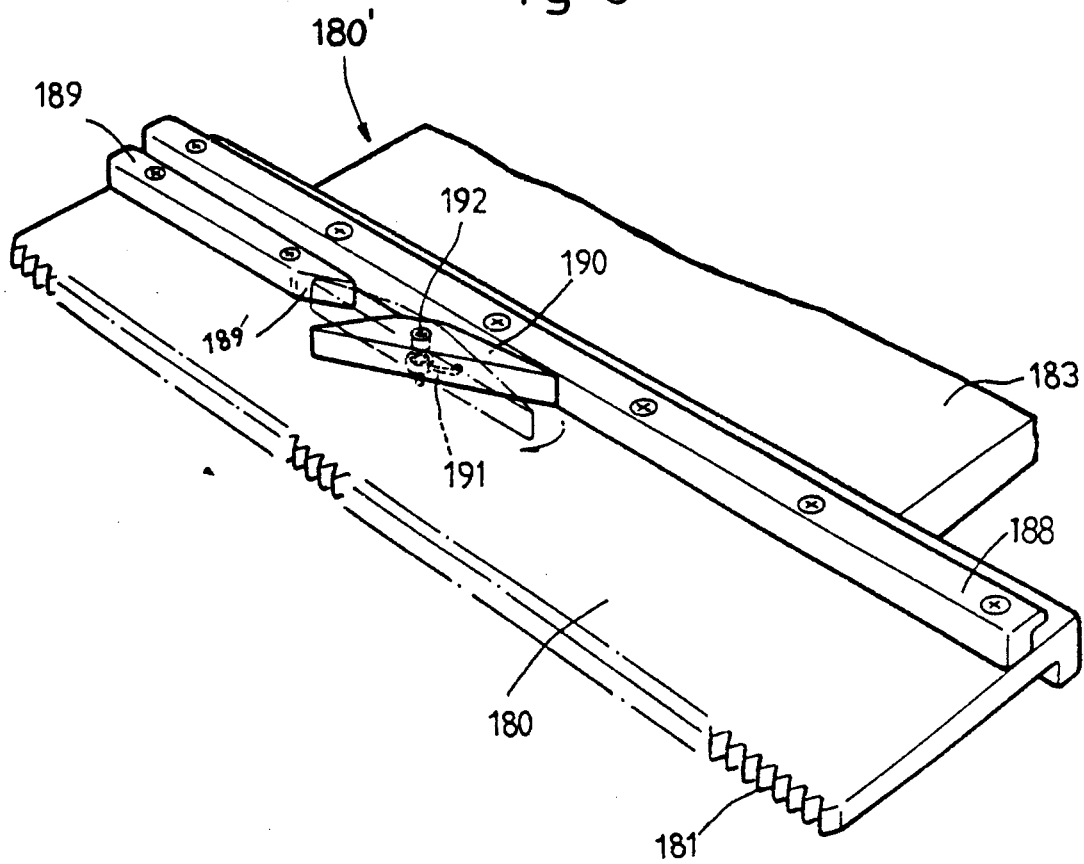
FIG. 8 is a partial perspective view of the third slider member.

Slidably mounted on the second planar slider member 170 is provided a third planar slider member generally designated by 180'. As shown in FIG. 8 the third planar slider member 180' comprises a pair of rack plates 180 and a plate 183 joining the rack plates 180.

The rack plates 180 each have a downwardly extending channel 187 for slidably engaging with the corresponding second slider raised planes 174, the channel 187 having a channeled portion facing in an outward direction. An upwardly extending channel 188 is bolted to the upper face of each of the rack plates 180, the channeled portions facing in an inward direction. To the upper face of the rack plate 180 and spaced parallel with the upwardly extending channel 188 are mounted a shorter member 189 fixedly and a triangular-shaped member 190 pivotally by a pivot member 192, the fixed shorter member 189 having a slanting surface 189' and the pivotally movable member 190 having a spring 191 under the pivot member 192. The triangular-shaped rotatable member 190 has three side surfaces one of which is biased away from the fixed member 189 by a force of the spring 191. A pair of sprockets 184 each having an idle bearing (not shown) are fixedly mounted to the front and rear surfaces of the middle joining plate 183. Teeth 181 are formed along the lengthwise ends of the rack plates 180 each of which is engagable with the corresponding pinion 186 which is engagable with the teeth in the open casing 144.

Figure 5:
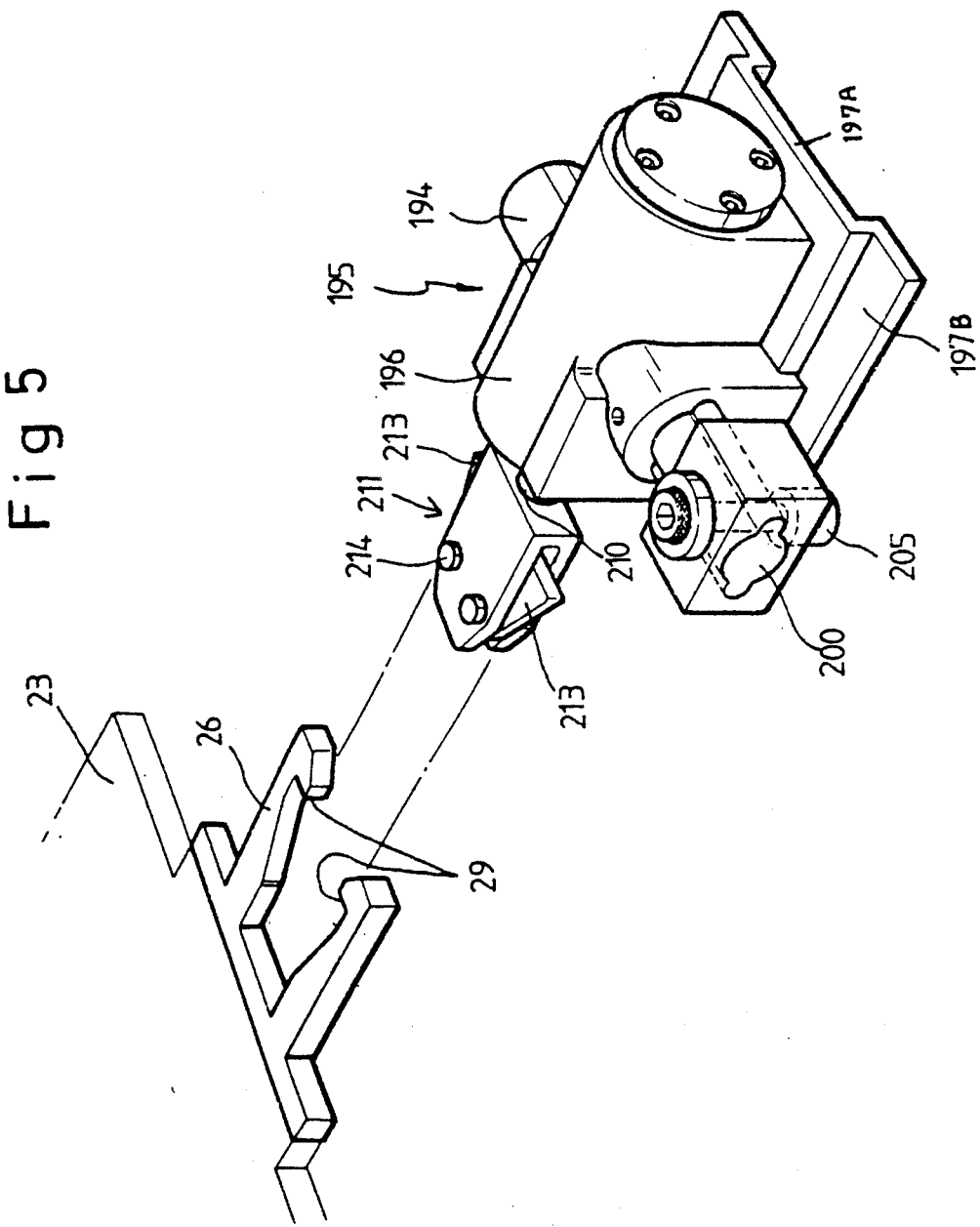
FIG. 5 is a perspective view of the mold and the third cylindrical slider member.
Figure 6:
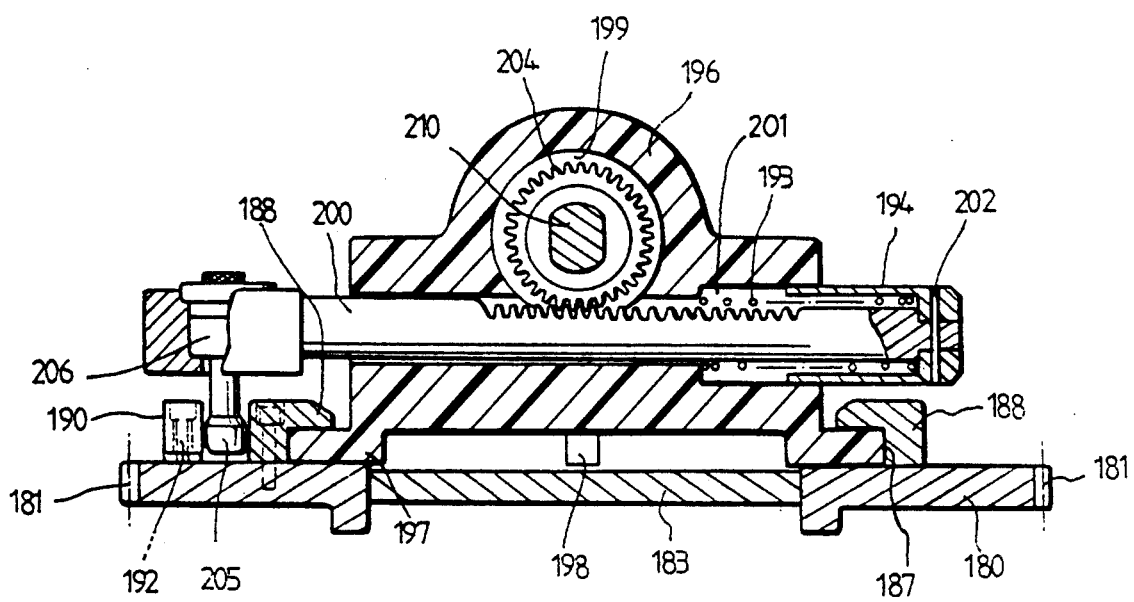
FIG. 6 is a longitudinal sectional view of the cylindrical slider member.
Figure 7:
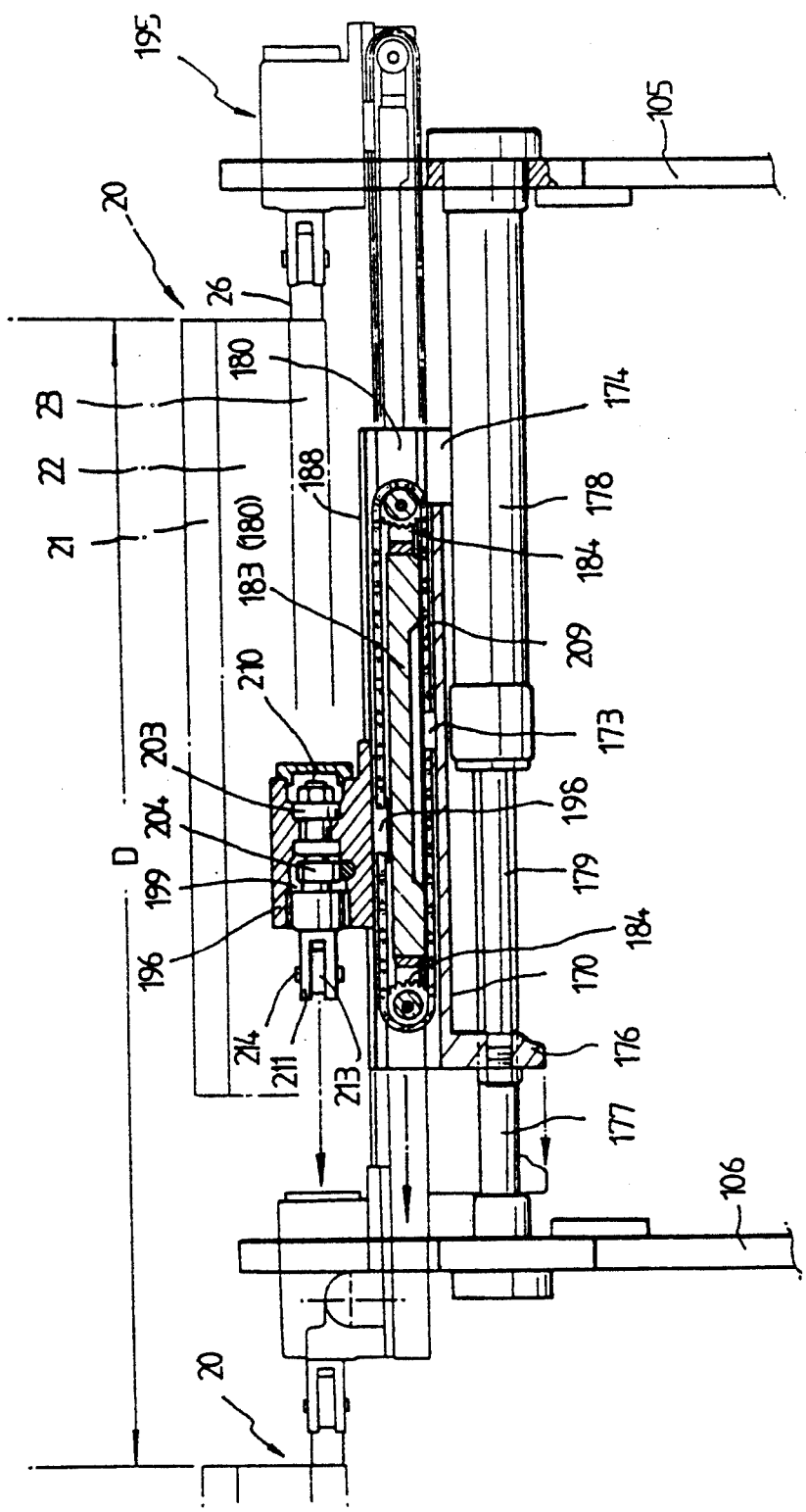
FIG. 7 is a side view of FIG. 4 partially in cross-section in operation.

Slidably mounted on the third planar slider member 180' is provided a cylindrical slider member generally designated by 195. The fourth cylindrical member 196 comprises, as shown in FIGS. 5 and 6, a cylindrical housing 196 and a stepped protruding member 197 for mounting the cylindrical housing 196 thereon. Within the cylindrical housing 196 are provided a lengthwise chamber 199 and a cross chamber 201 communicating with each other.

In the lengthwise chamber 199 is axially disposed a cross shaft 210 on which a pinion is mounted. A locking member 211 is mounted on the outward extending end of the shaft 210 for engaging with the latch member 26 of the lower mold member 23. The locking member 211 comprises a pair of locking elements 213 pivoted thereto. In the cross chamber 201 a rack 200 is provided for engaging with the pinion 204 in the lengthwise chamber 199. One end of the rack 200 is mounted a spring 193 therearound. Through the other end of the rack 200 is provided a shorter shaft 205 on which a bearing 206 is mounted.

The stepped protruding member 197 has a pair of integral outwardly extending plates 197B for being slidably received in the upwardly extending channel 188 in the third planar slider member 180. A raised plane 197A joins the outwardly extending plates 197B. To the underside of the middle raised plane 197A is fixed a chain bracket. A pair of chins 209 each passes over the sprockets 184 on the joining plate 183 of the third planar slider member and fixed to the brackets 198 and 173 of the stepped member 197 and thecond slider member 170.

Figure 9:
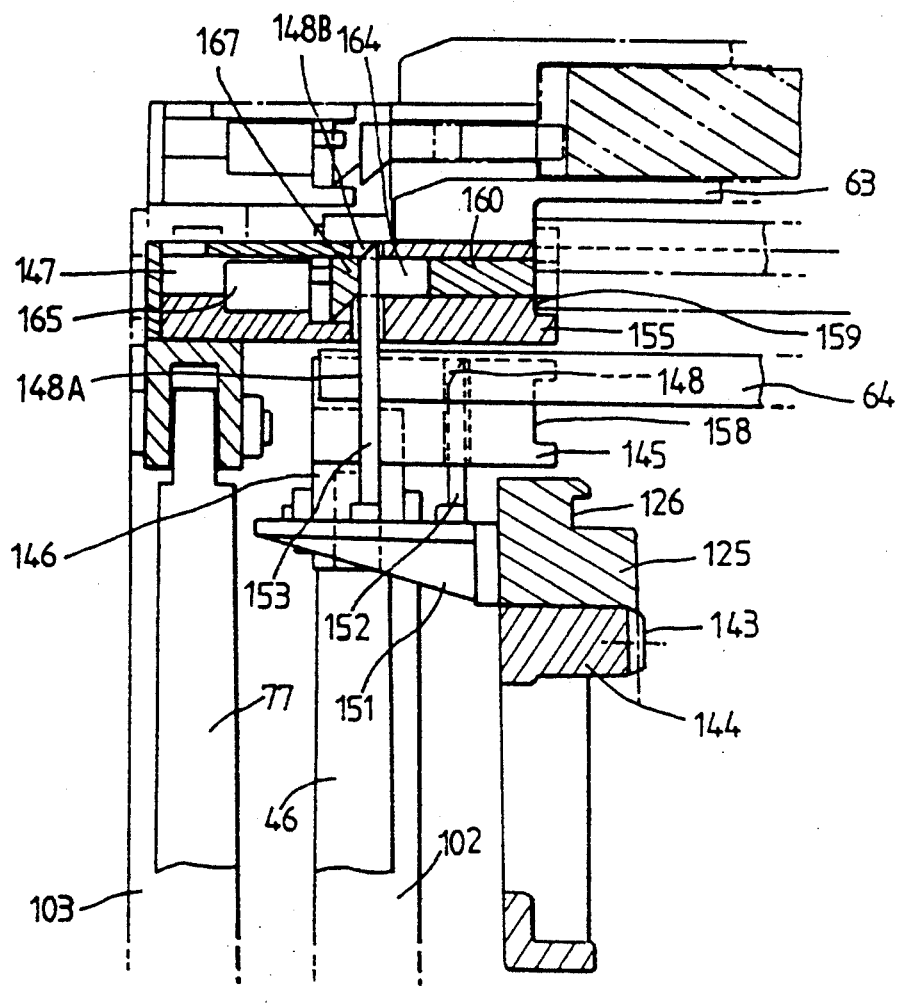
FIG. 9 is a longitudinal sectional view showing details of a three channel bar assembly.

Referring to FIG. 9, a pair of brackets 151 each is fixed to the corresponding lower channel 125. To the upper face of each of the brackets 151 are fixed a shorter pin 152 for being received in the passage 148 in the middle channel 145 and a longer pin 153 for being received in the passage 148B in the upper channel 155 through the passage 148A in the middle channel 145.

Figure 20:
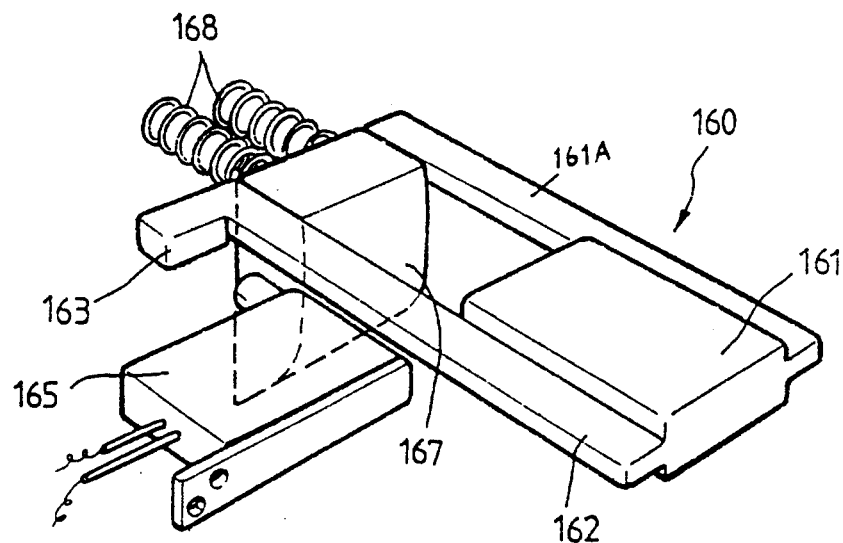
FIG. 20 is perspective view of an element which will be housed in the channel bars of the shorter and bigger frame members.
Figure 21:
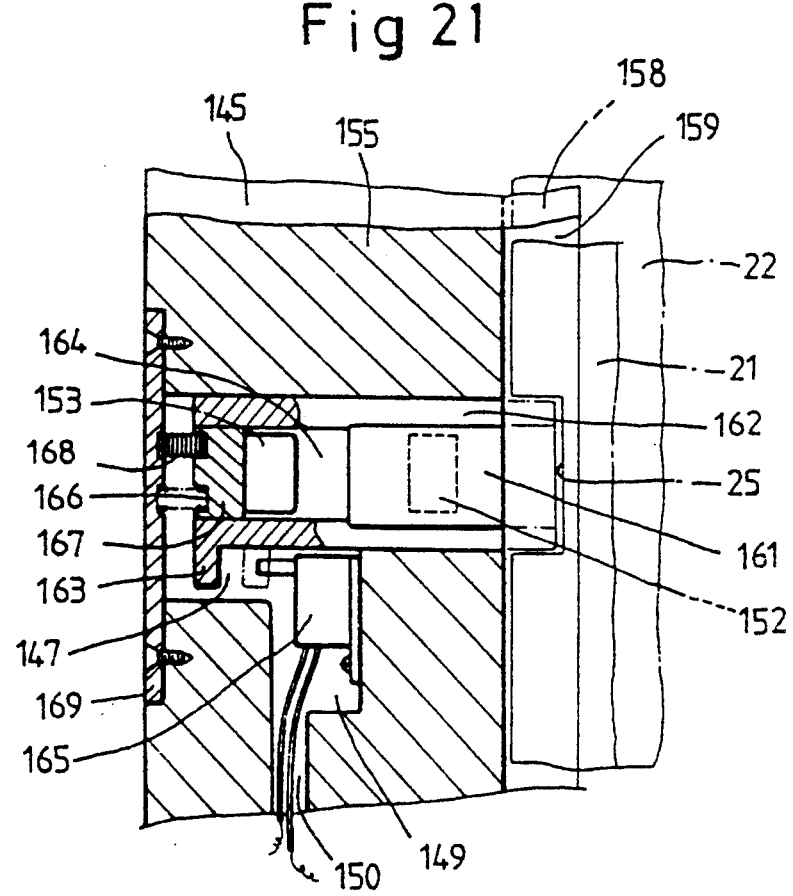
FIG. 21 is an enlarged cross-sectional view showing the element of FIG. 20 in the respective channel bars.
Figure 22:
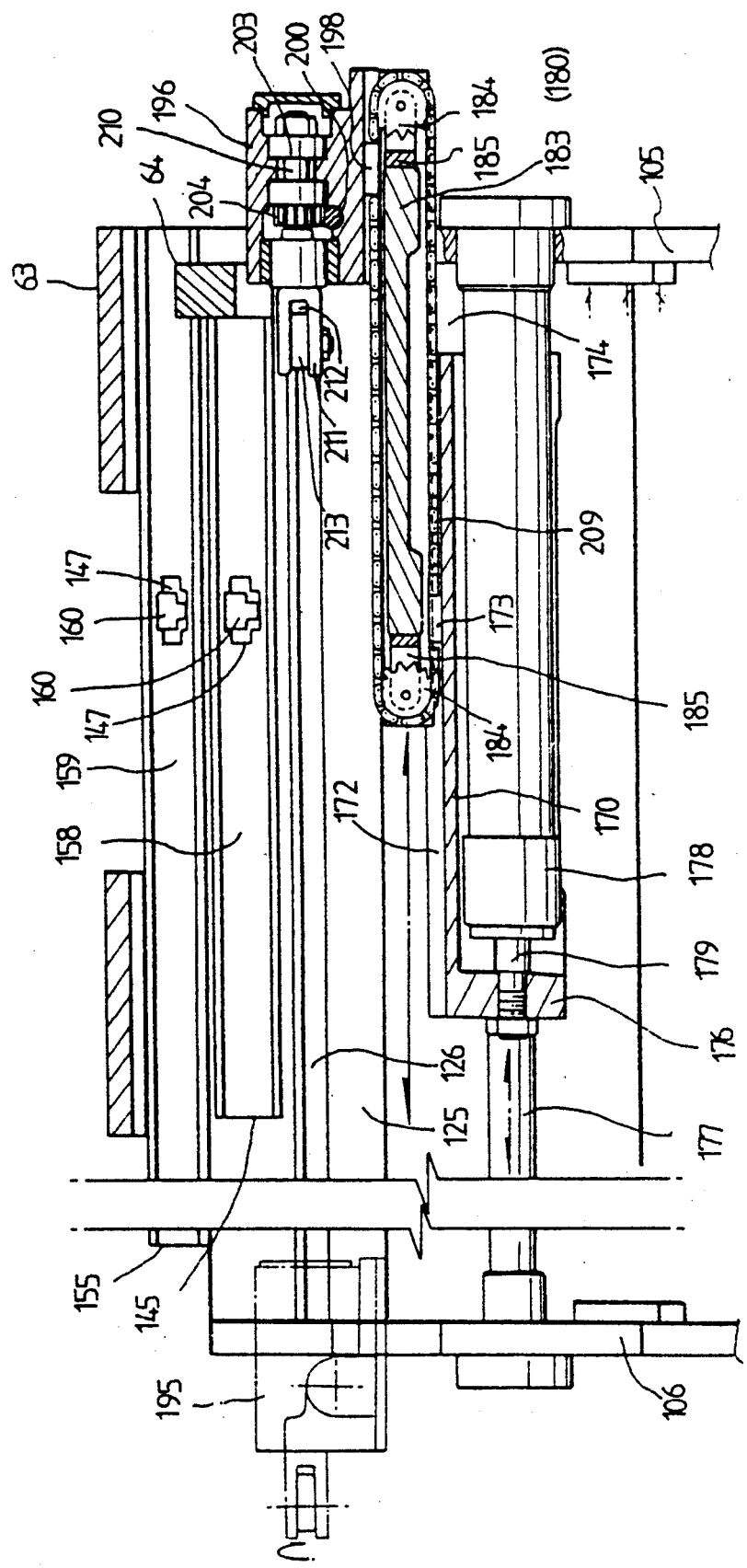
FIG. 22 is similar to FIG. 7, but showing the primary, secondary and tertiary slider members in retracted position.

Referring to FIG. 20, there is shown a channel-mold associating member 160. The channel-mold associating member 160 comprises an up-and-down protruding member 161 for engaging with the notches 25 in the mold members 21 and 22, a pair of horizontally extending members 161A, a downwardly extending member 167, 168 fixed to the downwardly extending member 167 and a sense switch 165 fixed to the downwardly extending member 167, the downwardly extending member 167 being rounded at the lower end thereof and one of the horizontally extending member being L-shaped. The mold-channel cooperable member is nested within the middle and the upper channel 145 and 155 of the inner frame and the outer frame.

With the assembly of the present invention described hereinabove, the operation of the shoe-sole molding system is now to be described.

Preferably, three presses P are provided in spaced parallel relationship and the mold control assembly is cooperable with the presses P consecutively by the use of the time span of the molding in one press.

The registration of the mold control assembly with the press P causes the mold control assembly rollable by the rollers 41 to stop by by switches 33. Then, the actuation of the carriage anchor cylinder 55 the pin 56 is lowered and received in the hollow boss 32 resulting in the keeping of the mold control assembly in place.

Then, upon actuation of the second slider control cylinder 178, the second slider control piston 179 will move slidably along the cross shafts 177 together with the second stepped slider member 170, thereby causing the pinions 186 to be rotated and engaging along the teeth 143 of the open casings 144. Simultaneously with this movement of the pinions 186, the third planar slider member 180' moves slidably, the distance of this latter movement being twice the distance of the second stepped slider 170 due to the teeth 143 and 181 and the third planar slider member 180'. Simultaneous with the before-described movement of the second stepped slider member 170 and the third planar slider member 180', the short shaft 205 moves from the mid position between the fixed member 189 and the rotatable member 190 through the passage defined by the upwardly extending channel 188 and the fixed member 189 towards the press P.

Simultaneous with the movement of the second stepped slider member 170 and the third planar slider member 180', the fourth cylindrical slider member 195 moves slidably towards the press P, the moving distance of the fourth cylindrical slider member 195 being approximately one and a half times of the third toothed slider member 170, resulting in three times of the second stepped slider member 170 due to connection of the chains 209 to the brockets 173 and 185 through the sprockets 184.

When the movement of the second stepped slider member 170, the third planar slider member 180' and the fourth cylindrical slider member 195 stop moving toward the press P, the locking elements 213 will engage the latch member 26 of the lower mold member 23.

After the locking elements 213 engage with the latch member 26, the slider control piston 179 will retract towards the slider control cylinder 178 causing the mold members 21, 22 and 23 to be telescoped within the corresponding channels 125, 145 and 155. Simultaneous with the telescoping process of the mold members, the short shaft 205 returns the passage between the fixed member 189 and the upwardly extending channel 188 and then pushes the rotatable member 190 to the position shown by the phantom line in FIG. 8 for passing along the rotatable member 190. In this condition, the longer and shorter pins 153 and 152 are in contact with and push the end-rounded member 167 of the associating member 160, springs 168 being in compression.

After the slider control cylinder 178 stops operating the bigger frame control cylinders 60 and the small frame control cylinder 85 will actuate for moving the bigger frame and the smaller frame upwardly.

According as the bigger and smaller frames move upwardly, the longer and shorter pins 153 and 152 pass through the corresponding passages 148B, 148A and 148 causing the associating members 160 to urge to move toward the corresponding mold members by the force of the spring 168 and be inserted into the corresponding notches 25 in the middle and upper members, thereby enabling the engaged pairs of channels and mold members to move together. Simultaneous with the upward movement of the bigger frame and smaller frame, the locking element 65 on the side uprights 102 of the smaller frame member will disengage the protruding holding member 66 on the channels 145 of the smaller frame member.

Simultaneous with the upward movement of the frame members, the links 45 and 76 move upwardly with the inwardly protruding pin 76' and the outwardly protruding pin 45' being slidably inserted in the longer outward groove 142 and the shorter inward groove 142 in the downwardly extending members 140 of the first slider member 137. Thereafter, the link control cylinder 135 actuates the link control piston 136 to move towards the body rear wall member 106, thereby pulling the links 45 and 76 towards the body rear wall member 106.

Simultaneous with the pulling movement of the links 45 and 76, the smaller frame and the bigger frame are raised with the corresponding mold members 21 and 22 being engaged therewith. After the frames stop in their raised position, only the bigger frame member is lowered slightly causing the ouwardly protruding pins 76' to remove from the groove 142 to the groove 74 of the uppermost regular tetragon-shaped frame member 70. Thereafter, the molding product is removed from the mold members and the rubber material is inserted into the mold members.

Following this, the link control piston 136 moves towards the body front wall member 105. Simultaneous with this movement, only the middle mold nesting channel 145 of the smaller frame is lowered, with the upper mold nesting channel 155 remaining in the raised position. Thereafter, the smaller frame control piston of the cylinder 85 is lowered causing the outwardly protruding pins 45' to remove from the grooves 141. Thereafter, the link control piston 136 again moves toward the body rear wall member 106 and the bigger frame control pistons of the cylinders 60 are again raised causing the outwardly protruding pins 76' again are received in the groove 142 in the member 140. Following this, the link control piston 136 retracts towards the body front wall member causing the upper molding receivable channel of the bigger frame to abut against the middle mold receivable channel of the smaller frame.

After the above-described movement, the bigger frame control piston of the cylinders 60 are lowered and the fourth cylindrical slider member 195 inserts the mold 20 into the press P.

The process of the insertion of the mold 20 into the press will now be described in detail. According as the cylindrical slider member 195 moves towards the press P, the shorter shaft 205 of the rack 200 will slide along the longer face of the rotatable member 190. Immediately after the shaft 205 passes the pivot member 192 the rotatable member 190 will be in the position shown by the solid line in FIG. 8, whereby the rack 200 will move towards the teeth 181 away from the upper channel 188 as long.

Over the cover plate 100 and the shafts 112 the bigger, outer frame member and the smaller, inner frame member are provided one above the other.

The bigger or outer frame member comprises a base plate 90, side wall members 103 upwardly fixed to the both side ends 91 of the base plate and channnel bars 155 pivoted to the side wall members 103.. The channel bars 155 are joined by a means 63 at the upper faces.

The bigger base 90 has a plurality of holes 92 in registration with the recesses 111 in the cover plate 100 through which the shafts 112 pass. Some of the holes 92 have fixing means 97 for closely passing the shafts around thereof. A bigger center hole 93 is provided in the bigger base 90 for passing the small frame control cylinder 86 therethrough. For controlling the bigger frame, the cylinders 60 are fixed to the underside of the bigger base 90.

Referring particularly to FIG. 14, a pair of the side walls 103 fixed to both side ends of the bigger base 90 each has a link 76 pivoted at 132 thereto and an inwardly extending protrusion 76'. The link 76 is pivoted at 77 to the channel bar 155 and the side wall member 103 is pivoted at 133 to the channel bar 155.

A pair of spaced channel bars 155 each has a channel portion facing in an inward direction within which the middle mold member is telescopic, and shorter and longer longitudinal passages 152 and 153 (see FIG. 9)

I claim:

1. A shoe sole molding system comprising:

a plurality of presses (P) spaced parallel with one another and a mold control assembly (A) cooperable with said presses (P) in turn, each of said presses (P) comprising a plurality of molds (20) for molding shoe soles of rubber material displaced one above the other, each of which having an upper mold member (21), a middle mold member (22) and a lower mold member (23), said mold members (21), (22), (23) each having a pair of lengthwise grooves (24) and notches (25) inwardly and continuously of said grooves (24) at both sides thereof, said lower mold member (23) having an integral latch member (26) fixed to the front thereof, a hydraulic cylinder (8) and a piston (9) for raising or lowering said molds (20), said hydraulic piston (9) having a pressure board (10) fixed to the upper end thereof, a mold support plate (7) detachably mounted on said pressure board (10) and having a heating element (11) therein, one of said molds (20) being detachably mounted on said mold support plate (7), the others of said molds (20) being displaced above said one mold (20) one above the other, said mold control assembly (A) comprising a body member, a carriage casing (C) for fixedly mounting said body member thereon, a rail member for rollably moving said carriage casing (C) therealong, said rail member having a pair of rails (31), a fixed base for fixing said rails (31) thereto having a hollow boss (32) at the upper face thereof, said carriage casing (C) comprising generally U-shaped wall members, a bottom plate (35), a cover plate (100) movably mounted on said carriage casing (C), and a pair of height control cylinders (58) having the lower end fixed to said bottom plate (35) and the upper end fixed to said body member, said bottom plate (35) comprising an anchor cylinder (55) and a piston having an anchor pin (56) fixed to the lower end thereof for keeping said mold control member in place and a pair of bigger frame control cylinders (60) having pistons fixed thereto at the lower ends thereof, said body member comprising a pair of upwardly extending front and rear wall members (105), (106) fixed to said carriage casing cover plate (100), a bigger frame of cube shape in general nested within said front and rear wall members (105), (106), a smaller frame of cube shape in general nested within said bigger frame, a pair of toothed open casings (144) opened in an inward direction within said smaller frame of cube shape and having the front and rear faces fixed to said body wall members respectively and teeth (143) provided along the inner upper length thereof, a lower channel member (125) for receiving slidably said lower mold member (23) fixed to the upper faces of said toothed open casings (144), said bigger frame member comprising a bottom plate (90), a pair of upwardly extending apertured side wall members (103) fixed to said bottom plate (90) at the lower ends thereof and having channel member (155) pivoted thereto for receiving slidably said upper mold member (21) within channeled portions thereof and a plate (63) for joining said channel member (145), each of said apertured side wall members (103) having a link (76) pivoted thereto, said link (76) having an inwardly extending pin 76' fixed to the lower end thereof, said bottom plate (90) having a plurality of non-central small holes (92) and said bigger frame bottom plate (90) having said bigger frame control cylinders (60) fixed thereto, said channel member (155) having a longitudinal through hole (148B), said smaller frame member comprising a bottom plate (80), a pair of extending apertured side wall members (103) fixed to said bottom plate (80) at the lower ends thereof and having channel member (145) pivoted thereto for receiving slidably said middle mold member (22) within channeled portions thereof and a plate (64) for joining said channel member (145), each of said apertured side wall members (102) having a link (45) pivoted thereto, said link (45) having an outwardly extending pin (45') fixed to the lower end thereof, said bottom plate (80) having a plurality of non-central holes (82) in registration with said non-central holes (92) in said bigger frame, said channel member (145) having a pair of spaced through holes (148A), (148), said hole (148A) communicating with said through hole (148B), said hole (148) being placed inwardly of said hole (148A), said body member further comprising a four-cornered frame member (70) displaced above said bottom plate (80) of said smaller frame and having a pair of downwardly extending plates (73) suspending from both leg members thereof, said suspending leg members (73) each having a lengthwise groove (74) facing in an outward direction for slidably receiving said outwardly extending link pin (76') therealong, two pairs of cross shafts (130), (177) fixed between said front and rear wall members (105), (106), one pair (130) of said shafts being displaced above said four-cornered frame member (70) and the other pair (177) being placed above and inwardly of said shafts (130), a first slider member displaced above said four-cornered frame member (70) and slidably moving along said shafts (130) and comprising a cross plate member (137) having a pair of holes (129) for receiving said shafts (130) and a link control cylinder (135) and a piston (136) fixed between said body front wall member (105) and the central area thereof, said cross plate member (137) having a pair of downwardly extending plates (140) suspending from both ends thereof, said suspending plates (140), each having an inner shorter groove (141) for slidably receiving said outwardly extending link pin (45') and an outer longer groove (142) for slidably receiving an inwardly extending link pin (46'), said outer longer groove (142) being displaced above and in registration with said outer grooves (74) of said four-cornered frame member (70), a second stepped slider member (170) displaced above and inwardly of and movable together with said first slider member, said second stepped slider member (170) comprising a pair of raised planes (174) having downwardly extending apertured protrusions (174') at the front and rear edges thereof and a recessed plane (172) joining said raised planes (174) and having downwardly extending apertured protrusions (176) at the rear edge thereof and a chain bracket (173) fixed thereon, said shafts (177) for slidably mounting said second stepped slider member (170) therealong extending through said apertured protrusions (174'), said raised planes (174) each having a pinion (186) bolted thereto for engaging with the corresponding one of said teeth (143) of said toothed casings (144), a third toothed planar slider member (180') slidably mounted on and movable together with said second stepped slider member (170), said third planar slider member (180') having a pair of toothed plates (180), a joining plate (183) joining said toothed plates (180), said toothed plates (180) each having teeth (181) along the outer edge thereof for engaging said pinions (186) adjacent thereof and a downwardly extending lengthwise channel (187) for being slidably received in said recessed plane (172) of said second slider member (170), an upwardly extending lengthwise channel (188), a fixed member (189) spaced parallel with said upwardly extending lengthwise channel (188) having a slanting surface (189') and a rotatable member of triangular shape (190) pivoted to the upper face of said toothed plates (180), said joining plate having rear and front sprockets (184) fixed to the rear and front faces thereof, a fourth cylindrical slider member (195) slidably mounted on and movable with said third toothed planar slider member (180') and being placed between said lower channel member (125) comprising a cylindrical housing (196), a stepped-base (197) for mounting said cylindrical housing (196), a lengthwise chamber (199), a cross chamber (201) communicating with said lengthwise chamber (199), said lengthwise chamber (199) having a shaft (210) therein and a pinion (204) mounted on said shaft (210), said cross chamber (201) having a lengthwise rack (201) therein for engaging with the pinion (204) of said lengthwise chamber (199), said rack (201) having a spring (193) around one end thereof and a through shaft (205) at the other end thereof, said shaft (210) in said lengthwise chamber (199) having a locking member (211) fixed tot he outwardly extending end thereof, said locking member (211) having a pair of locking elements (213) pivoted thereto for engaging with said latch member (26) of said lower mold member (23) and pulling said mold members (21), (22), (23) out of said press (P), said stepped base (197) having a chain bracket (198) fixed to the underside thereof, said mold control assembly further comprising a plurality of columns (39) movably mounted to said carriage bottom plate (35) at the lower ends thereof, passing through said carriage cover plate (100) and fixed to a frame member above said four-cornered frame member (70), a pair of height control cylinders (58) fixed to the upper face of said carriage bottom plate (35) at the lower ends thereof and to the front and rear body wall members (105), (106) at the upper faces thereof, a plurality of columns (92) fixed to the upper face of said carriage cover plate (100) at their bottom ends and to said four cornered frame member (70) movably through said registered holes (82), (92) of said bigger frame and said smaller frame, a pair of link chains (209) each being fixed to said chain brackets (198) at both ends thereof through said sprockets (184), a smaller frame control cylinder (85) for controlling said smaller frame fixed to the upper face of said carriage through a bottom center hold of said bigger frame (90) and a piston fixed to said bottom plate (80) of said smaller frame, a mold-channel cooperable means (160) being nested within said channel members (145), (155) of said smaller and bigger frames for urging said channels and the corresponding one of said molds to cooperate with each other and comprising a spring (168) for urging said means to insert into said notches (25) of said mold members, and a pair of brackets (151) each being fixed to both sides of said lower channel (125) and having a longer pin (153) and a shorter pin (152), said longer pin (153) being able to control said mold-channel cooperable means (160) by being inserted into said through hole (148B) through said hold (148A) and said shorter pin (152) for controlling said mold-channel cooperable means (160) by being inserted in said through hole (148).

2. A shoe hole molding system according to claim 1, wherein the moving distance of said second, third and fourth slider members are approximately in the ratio of 1:2:3 because of the movement of said pinions (186) on said second slider member, teeth (143), (81) of said toothed planar slider member, and the connection of said second, third and fourth slider members by said chains (209).

* * * * *